April 19, 1938.   E. M. MILLER   2,114,965

SWITCHING MECHANISM FOR FUEL BURNING SYSTEMS

Original Filed May 27, 1933

Inventor

Ernest M. Miller

By George H. Fisher

Attorney

Patented Apr. 19, 1938

2,114,965

UNITED STATES PATENT OFFICE 2,114,965

SWITCHING MECHANISM FOR FUEL BURNING SYSTEMS

Ernest M. Miller, Minneapolis, Minn., assignor to Minneapolis-Honeywell Regulator Company, Minneapolis, Minn., a corporation of Delaware Original application May 27, 1933, Serial No. 673,265. Divided and this application January 15, 1936, Serial No. 59,237

16 Claims. (Cl. 200—137)

This invention relates to improved switching mechanisms which have particular utility in connection with fuel burning systems, although such switching mechanisms have also to a certain extent general utility in the field of automatic control and the related arts.

This application forms a division of my copending application, Serial No. 673,265, filed May 27, 1933, for Fuel burning systems and switching mechanism therefor.

One of the objects of the present invention is the provision of a thermostatic switching mechanism including two thermostatic elements, one of which responds relatively quickly to changes in the temperature of the medium to which it is subjected while the other responds more slowly to such changes. In the instant embodiment of the invention, the construction is such that both thermostatic elements are equally sensitive but the arrangement is such that one of the thermostatic elements shields the other thermostatic element in such a manner that the one so shielded responds more slowly to changes in the temperature of the medium to which the two thermostatic elements respond. In the particular embodiment of the invention, to be hereinafter disclosed, both of the thermostatic elements are of the diaphragm type, although this is not absolutely necessary. It is to be noted in particular that the thermostatic element which is shielded by the other thermostatic element may be of any desired form or construction but there are particular advantages in utilizing a thermostatic element of the diaphragm type for the purpose of shielding the other thermostatic element.

Another object of the invention is the provision of two thermostatic elements, one of which responds quickly and the other of which responds more slowly to changes in temperature, each of the thermostatic elements operating a switch, one of the switches moving to open position whereas the other of the switches moves to closed position upon temperature change in one direction, with the result that the switches are overlappingly controlled upon temperature change in one direction and are non-overlappingly controlled upon temperature change in the other direction. In other words, upon temperature change in one direction, one of the switches is closed before the other of the switches is opened, whereas upon temperature change in the opposite direction, the first switch opens prior to closing of the second switch.

More specifically, an object of the invention is the provision of a thermostatic element which responds to temperature changes relatively quickly and moves a switch to closed position upon rise in temperature in combination with a second thermostatic element which responds to changes in temperature more slowly than the first mentioned thermostatic element and controls a switch to move it to open position upon rise in temperature. As a result, the first mentioned switch is closed prior to opening of the last named switch upon rise in temperature but is opened prior to closing of the last named switch upon fall in temperature. In the specific construction herein disclosed, the two thermostatic elements are connected to their respective switches by slip friction connecting means in order that the switches are operated upon temperature reversals rather than at any particular predetermined temperatures.

A further object of the invention is the provision of switching mechanism which is controlled by the conjoint action of two thermostatic elements, one of which responds relatively quickly to changes in temperature whereas the other thermostatic element responds more slowly to changes in temperature.

Another object of the invention is the provision of temperature operated switching mechanism comprising a thermostatically operated switch in which the thermostatic element is shielded from the temperature to which it responds. Such an arrangement has particular utility where the thermostatic element responds to the temperature of the products of combustion of a fuel burning system and where the shielding member seals the thermostatic element from direct contact with the products of combustion.

A further object of the invention is the provision of a switching mechanism including first circuit controlling means adapted to be moved to open and closed position by an actuator in combination with a second circuit controlling means which is operated by the movement of the first circuit controlling means in moving from its open to closed positions and vice versa.

Other objects will in part be obvious and in part pointed out hereinafter.

The invention, accordingly, consists in features of construction, combinations of elements and arrangements of parts, as will be exemplified in the structure to be hereinafter described and the scope of the application of which will be indicated in the following claims.

In the accompanying drawing, in which is shown one of the various possible embodiments of this invention:

Figures 1, 2, 3:
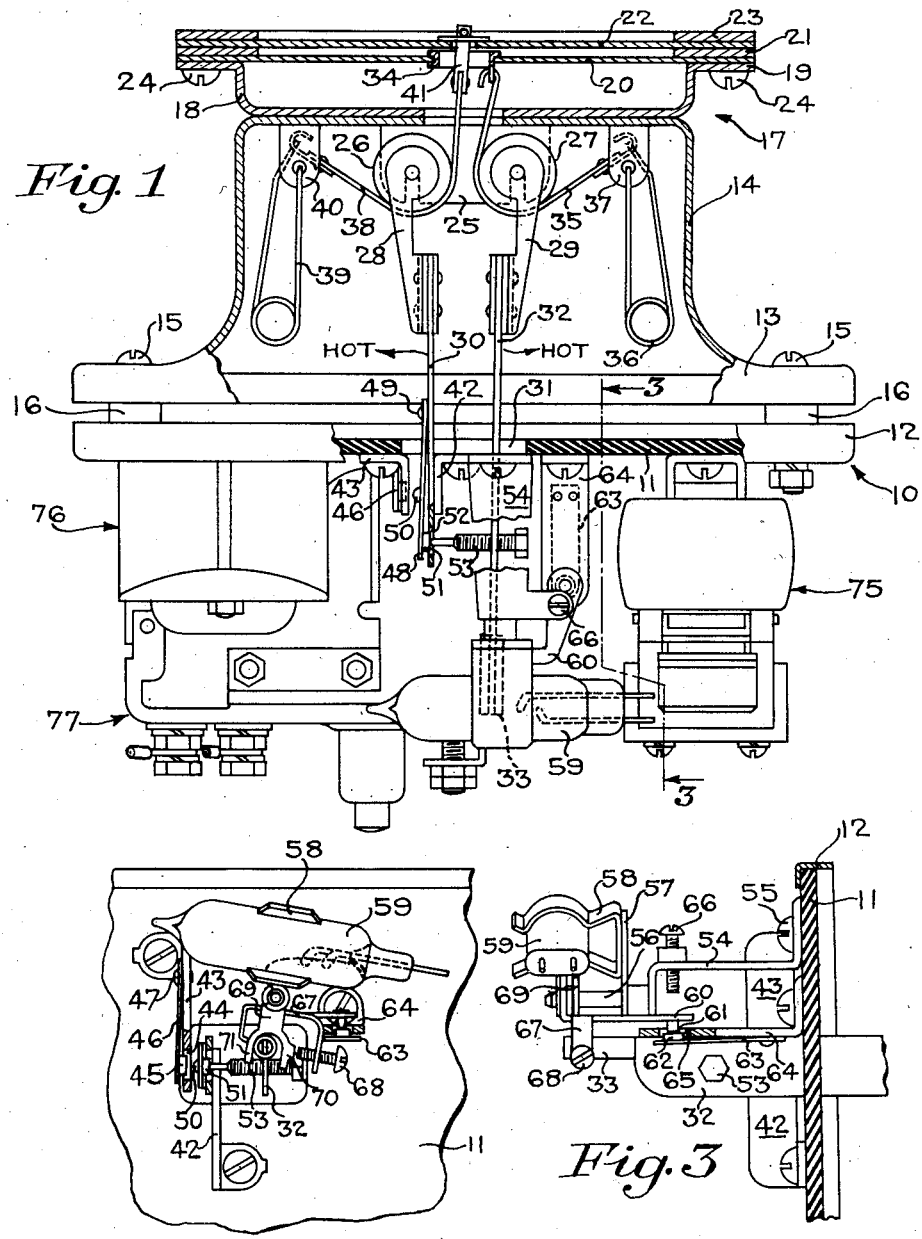
Figure 1 is a top view of the switching mechanism comprising one of the features of the present invention, certain parts being broken away and certain other parts being in section to more clearly show the construction thereof.
Figure 2 is a front view of the switching mechanism shown in Figure 1.
Figure 3 is a sectional view taken on line 3—3 of Figure 1.

Referring first to Figure 1. The switching mechanism and certain other conventional devices utilized in the control of a fuel burning system, illustratively are shown as mounted upon or supported by a base generally indicated at 10. Base 10 is comprised of a panel 11 of electrical insulating material and a steel frame member 12.

A housing 13, provided with an integral tubular projection 14, is secured to base 10 in any suitable manner, such as screws 15 passed through suitable spacing sleeves 16.

A diaphragm assembly, generally indicated at 17, comprises a circular member having a depressed portion 18 adapted to be secured to the outer side of projection 14, and a circular flange 19 upon which is placed a first or inner diaphragm 20, upon which in turn is placed a spacing ring 21 and a second or additional diaphragm 22. A clamping ring 23 is placed above or outside of diaphragm 22 and the whole secured together in any suitable manner, such as by screws 24.

A bracket 25 mounted within projection 14, rotatably supports a pair of rollers 26 and 27, to each of which is secured an arm 28 and 29 respectively. An actuating arm 30, carried by arm 28, projects through an opening 31 in insulating panel 11, and terminates in front of panel 11. A similar actuating arm 32, carried by arm 29, extends through the opening 31 and panel 11. The outermost end of arm 32 which extends beyond the end of arm 30, is reduced in width and carries a cylindrical bushing 33 of electrical insulating material.

Diaphragm 20 is provided with a centrally located opening, the edge of which is reinforced by a collar 34 to which is attached one end of a ribbon 35, which passes around roller 27 and has its other end secured to an end of a spring 36. The other end of spring 36 is secured in any suitable manner to a bracket 37 carried by tubular projection 14. Correspondingly, a ribbon 38, which passes under roller 26, has one of its ends secured to an end of a spring 39 and its other end secured to a pin 41 which extends through the opening in diaphragm 20 and is suitably connected to the diaphragm 22. The other end of spring 39 is secured in any suitable manner to a bracket 40 carried by projection 14. It will thus be seen that movement of the diaphragm 22 is transmitted through ribbon 38 to roller 26 and hence to arm 30, and that correspondingly the movement of diaphragm 20 is transmitted through ribbon 35 to roller 27 and hence to arm 32.

Counter-clockwise movement of actuating arm 30 is limited by a stop 42 which may take the form of a bracket secured to panel 11. Clockwise movement is similarly limited by a bracket 43 which is provided with an opening 44, into which projects a contact 45 carried by one end of a light spring finger 46, the other end of which is secured to bracket 43 in any desired manner, such as rivet 47. A similar light spring finger 48 has one of its ends secured to actuating arm 30 by any suitable means, such as rivet 49. Intermediate between the ends of spring 48 is located a contact 50, which, upon clockwise rotation of arm 30, enters opening 44 in bracket 43 and engages contact 45. The outer or free end of spring 48 carries a contact 51 adapted to enter an opening 52 formed in arm 30 and cooperate with a contact screw 53 carried by actuating arm 32.

A bracket 54 secured to panel 11 by any suitable means, such as a screw 55, supports a stud shaft 56 upon which is pivotally mounted a carrier 57 which supports a mercury switch clip 58 carrying a mercury switch 59. Carrier 57 is provided with a contact carrying extension 60, which carries a contact 61 adapted to engage a contact 62 carried by a spring finger 63. Spring finger 63 is secured to a bracket 64 carried by panel 11, and is provided with an aperture 65 into which contact 62 projects. Engagement of extension 60 with bracket 64 determines the limit of clockwise movement of mercury switch 59. Counter-clockwise movement of mercury switch 59 is limited by a screw 66 projecting through bracket 54 and adapted to be engaged by extension 60.

The carrier 57 is additionally provided with a yoke 67, one arm of which is provided with a screw 68 for the purpose of adjusting the effective distance between the two arms of yoke 67. A link 69, which is pivoted to stud shaft 56, extends through an opening in carrier 57 and terminates in a fork having arms 70 and 71 which straddle the bushing 33 of insulating material carried by the outer end of actuating arm 32.

Diaphragm 22 is so arranged in the assembly of the device as to be directly exposed to the temperature of the medium to which it is to respond, and when the mechanism is used in conjunction with a control system for a fuel burning apparatus, diaphragm 22 is so positioned as to be directly exposed to the flame produced by the burning fuel. Figure 1 discloses the switching mechanism in its cold position and if a fire is now started or the temperature to which diaphragms 20 and 22 are exposed otherwise be increased, diaphragm 22 will become heated to a higher degree and will attempt to expand. Circumferential expansion is prevented by means of screw 24, and as a result the center portion of diaphragm 22 bulges inwardly by reason of the tension supplied by spring 39 transmitted through ribbon 38. By reason of the friction of ribbon 38 on roller 26 the downward movement of the center of diaphragm 22 rotates roller 26 and consequentially actuating arm 30 in a clockwise direction, with the result that contact 51 is moved out of engagement with contact switch 53, and upon continued rise in temperature contact 50 is moved into engagement with contact 45. Further rise will cause spring finger 48 to abut bracket 43 and prevent further clockwise rotation of arm 30. However, should the temperature continue to increase and diaphragm 22 continue to expand, further downward movement of the central portion of diaphragm 22 is permitted, since ribbon 38 will slip over the surface of roller 26.

The increase in temperature above discussed will be transmitted to diaphragm 20 more slowly, since diaphragm 20 is shielded from direct exposure to the flame by diaphragm 22. However, after a definite time interval such increase in temperature will be transmitted to diaphragm 20, whereupon its central portion will move inwardly for the same reason above described for diaphragm 22, and cause roller 27 and actuating arm 32 to rotate in a counter-clockwise direction. Contact screw 53 thereby moves further away from contact 51 and bushing 33 moves away from arm 71 and engages arm 70 of link 69. Continued inward movement of diaphragm 20 results in movement of arm 70 of link 69 into engagement with screw 68, whereupon mercury switch 57 is tilted in a counter-clockwise direction. This movement of switch carrier 57 disengages contact 61 from contact 62 and opens the circuit of mercury switch 59. Switch 59 will become unbalanced, the mercury therein rolling to the left end of the switch in consequence of the above movement, and continue tilting in a counter-clockwise direction. Extension 60 will thus be brought into engagement with the end of screw 66 and limit further clockwise movement of mercury switch 59 and its carrier 57. The various switches are now, as a result of the above described movement, in their hot positions, and any continued movement of either of diaphragms 20 or 22 merely results in slipping of their respective ribbons 35 and 38 over their respective rollers 27 and 26.

When the temperature to which diaphragms 22 and 20 are exposed lowers, diaphragm 22, being directly exposed to medium change in temperature, will respond more rapidly than diaphragm 20 and its central portion begin to move outwardly, rotating roller 26 through ribbon 38 and hence arm 30 in a counter-clockwise direction. Initial counter-clockwise movement of arm 30 separates contact 45, after which the engagement of arm 30 with stop bracket 42 limits further counter-clockwise rotation thereof. Continued upward movement of the center portion of diaphragm 22 thereafter merely results in slipping between ribbon 38 and roller 26. After a time interval diaphragm 20 will also respond to the lowering of the temperature and its center portion will begin moving outwardly, resulting in a clockwise rotation of roller 27 and actuating arm 32. Initial clockwise rotation of actuating arm 32 will cause bushing 33 to disengage arm 70 of link 69, pick up arm 71, and bring arm 71 into engagement with yoke 67 to rotate mercury switch 59 in a clockwise direction. When switch 59 has been rotated sufficiently far to cause the mercury to move to the right hand end thereof and close the circuit, the weight of the mercury will cause a further quick clockwise rotation of mercury switch 59 and hence carrier 57, with the result that contact 61 will engage contact 62. Continued clockwise rotation of arm 32 will bring bushing 33 into engagement with arm 71 of link 69 and contact screw 53 into engagement with contact 51. Further clockwise motion is precluded by engagement of extension 60 with bracket 64, and a further upward movement of the center portion of diaphragm 20 will again result in slipping between ribbon 35 and roller 27. The parts have now returned to their cold position as shown in the drawing.

Form the foregoing description it will be noted that the switch comprised by contact screw 53 and contact 51 is controlled by conjoint action of two thermostatic elements, illustratively diaphragms 22 and 20, one of which responds quickly to temperature changes whereas the other responds more slowly. It will also be noted that on temperature rise contact 50 is quickly moved into engagement with contact 45 and after an interval contact 61 is moved out of engagement with contact 62 with the result that these contacts are overlappingly controlled on temperature rise. In other words, the two switches are both closed during a short period although at the inception of the movement one of the switches was open and the other was closed. On temperature fall contact 50 quickly disengages contact 45 and after an interval contact 61 engages contact 62. On temperature fall, therefore, the two switches are non-overlappingly controlled, that is, the two switches are not both closed at the same time for even the above mentioned short period.

The mechanism also is arranged in such manner that the closing of contacts 61 and 62 is dependent upon actual movement of mercury switch 59 so as to insure that the circuit to switch 59 is closed every time the circuit to contacts 61 and 62 is closed. A positive check is thus given to the operation of mercury switch 59 since the operation of contacts 61 and 62 is controlled by the actual movement of mercury switch 59 and not the movement of the actuator which in turn actuates switch 59.

When the switching mechanism of the present invention is used to control a fuel burning system such as an automatically controlled oil burner, panel 11 may support a relay of usual form generally indicated at 75, a step-down transformer generally indicated at 76, and a thermostatically operated safety switch generally indicated at 77, all of which parts are now well known in the art of automatic control. A simple oil burner circuit which may be advantageously utilized with the switching mechanism above described, is disclosed in my co-pending application No. 673,265 above mentioned.

As many possible embodiments may be made in the above invention and as many changes might be made in the embodiments above set forth, it is to be understood that all material hereinbefore set forth or shown in the accompanying drawing is to be interpreted as illustrative and not in a limiting sense.

I claim as my invention:

1. A device of the class described for responding to a temperature produced by a source of heat, comprising, in combination, first and second thermostatic elements normally responding to the same degree to similar changes in temperature in equal lengths of time, said thermostatic elements being so arranged that one of them shields the other from all direct exposure to said source of heat either by radiation or convection, whereby one of said thermostatic elements responds to temperature change emanating from said source of heat more quickly than the other, and switching mechanism controlled by said thermostatic elements.

2. A device of the class described for responding to a temperature produced by a source of heat, comprising, in combination, a first thermostatic element, switching mechanism associated with said element, a second thermostatic element, switching mechanism associated with said second element, said first and second thermostatic elements normally responding to the same degree to similar changes of temperature in equal lengths of time, said elements being so arranged that one of them shields the other entirely from direct exposure to temperature change emanating from said source of heat by radiation, whereby one of said elements responds to temperature change more quickly than the other, said switching mechanism being controlled by the conjoint action of said thermostatic elements.

3. A device of the class described, comprising, in combination, a thermostatic diaphragm having a face directly exposed to a temperature to which it responds, whereby said diaphragm quickly responds to said temperature changes, a thermostatic element positioned from said thermostatic diaphragm in a direction remote to that face directly exposed to said temperature changes and hence shielded from direct exposure to said temperature changes, whereby said element responds relatively slowly thereto, switching mechanism controlled by said thermostatic diaphragm, and switching mechanism controlled by said element.

4. A device of the class described, comprising, in combination, a thermostatic diaphragm having a face directly exposed to a temperature to which it responds, whereby said diaphragm responds relatively quickly to said temperature changes, a thermostatic element positioned from said thermostatic diaphragm in a direction remote to that face directly exposed to said temperature changes and hence shielded from direct exposure to said temperature changes, whereby said second element responds relatively slowly thereto, and switching mechanism controlled by the conjoint action of said thermostatic element and said diaphragm.

5. A device of the character described, comprising, in combination, a thermostatic element of substantial surface area, having a face directly exposed to a variable temperature condition, a second thermostat positioned therefrom in a direction opposite to that face exposed to said variable temperature, whereby said temperature, in order to affect said second thermostatic element must pass through said first thermostatic element, and switching mechanism actuated by the conjoint action of said elements.

6. A device of the character described, comprising, in combination, a container having an open end, a temperature responsive diaphragm completely closing the end of said container and adapted to have its exposed surface subjected to a medium of changing temperatures, a temperature responsive element located in said container, whereby the same is shielded by said diaphragm, and switching mechanism controlled by said diaphragm and said element.

7. A device of the character described, comprising, in combination, a container having an open end, a temperature responsive diaphragm completely closing the open end of said container, and adapted to have its outer surface exposed to changing temperatures, a second temperature responsive diaphragm located within the said container and shielded from direct exposure to said temperature changes by said diaphragm and switching mechanism controlled by the conjoint action of said diaphragms.

8. A device of the character described, comprising, in combination, a first thermostatic element having its outer surface exposed to a medium of changing temperatures, a second thermostatic element shielded from said medium, a first switch, connections between said first thermostatic element and switch for operating the latter to open and closed positions, a second switch movable to open and closed positions by said second thermostatic element, one of said switches opening and the other of said switches closing on temperature rise, whereby the switches are overlappingly controlled upon temperature changes in one direction and non-overlappingly controlled upon temperature changes in the other direction.

9. A device of the character described, comprising, in combination, a first thermostatic element having its outer surface exposed to a medium of changing temperatures, a second thermostatic element shielded from said medium, a first switch, connections between said first thermostatic element and switch for operating the latter to open and closed positions, a second switch controlled by said second thermostatic element and moved to open and closed positions thereby, one of said switches opening and the other of said switches closing on temperature rise, whereby upon temperature rise said first switch is closed prior to opening of said second switch, and upon temperature fall said first switch opens prior to closing of said second switch, resulting in overlapping control of said switches on temperature rise and non-overlapping control of said switches on temperature fall.

10. A device of the character described, comprising, in combination, a first thermostatic element comprising a diaphragm which responds relatively slowly to temperature change, a first switch, slip friction connecting means connecting said first element and said first switch, said first element opening said first switch on temperature rise, a second thermostatic element adapted to shield said first element and which responds relatively quickly to temperature changes, a second switch, a slip friction connecting means between said second thermostatic element and second switch, said second switch closing on temperature rise, whereby said first and second switches are overlappingly controlled on temperature rise and non-overlappingly controlled on temperature fall.

11. A device of the character described comprising, in combination, an element responsive to changes in the value of condition, a second element responsive to changes in the value of condition, a first switch, connections between said first mentioned element and said switch for operating the former to open and closed positions, a second switch movable to open and closed positions by said second element, one of said switches opening and the other of said switches closing upon changes of said condition value in one direction, and means whereby changes of said condition value in one direction affects one of said elements more slowly than the other, whereby said switches are overlappingly controlled upon condition value changes in said one direction and non-overlappingly controlled upon changes in said condition value in the other direction.

12. A device of the character described comprising, in combination, a container having an open end, a condition responsive diaphragm completely closing the end of said container and adapted to have its exposed surface subjected to a medium of changing condition values, a condition responsive element located in said container whereby the same is shielded by said diaphragm, switching mechanism controlled by said diaphragm, and additional switching mechanism controlled by said element.

13. A device of the character described comprising in combination, a container having an open end, a condition responsive diaphragm completely closing said open end of said container and adapted to have its outer surface exposed to a medium of changing condition values, a second condition responsive diaphragm located within said container and shielded from direct exposure to said condition changes by said first mentioned diaphragm and switching mechanism controlled by the conjoint action of said diaphragms.

14. A thermostatic switch for responding to temperature change produced by a source of heat, comprising, in combination, a casing, a thermostatic element located therein, a switch controlled by said thermostatic element, and a relatively imperforate thermally responsive shield interposed between said thermostatic element and said source of heat, whereby said temperature change is transmitted to said thermostatic element by conductivity through said shield, and a second switch controlled by the thermal actuation of said shield.

15. A thermostatic switch adapted to respond to temperature change emanating from a source of heat, comprising in combination, a casing, a thermostatic element located within and completely enclosed by said casing, a portion of said casing being also temperature responsive, and mechanism controlled by the conjoint action of said thermostatic element, and said temperature responsive portion of said casing.

16. In a device of the character described, a thermostatic element, a switch controlled thereby, a casing completely enclosing said thermostatic element, a portion of said casing adapted to respond to temperature change, and a switch controlled by said temperature responsive portion, said thermostatic element and said temperature responsive portion of said casing being normally adapted to respond to the same degree to identical temperature changes, but said casing serving to shield said element from direct contact with said source of heat, whereby said portion of said casing responds more quickly to temperature change than said element and hence actuates its corresponding switch more rapidly.

ERNEST M. MILLER.